(12) United States Patent
Nordlin

(10) Patent No.: US 6,735,870 B2
(45) Date of Patent: May 18, 2004

(54) CUTTER FOR FIBER OPTIC CABLE AND METHOD OF USING SAME

(75) Inventor: William F. Nordlin, Poplar Grove, IL (US)

(73) Assignee: Greenlee Textron Inc., Rockford, IL (US)

( * ) Notice: Subject to any disclaimer, the term of this patent is extended or adjusted under 35 U.S.C. 154(b) by 0 days.

(21) Appl. No.: 10/027,141

(22) Filed: Dec. 20, 2001

(65) Prior Publication Data

US 2002/0088123 A1 Jul. 11, 2002

Related U.S. Application Data

(60) Provisional application No. 60/260,434, filed on Jan. 9, 2001.

(51) Int. Cl.[7] .............................................. B26B 13/00
(52) U.S. Cl. ....................................................... 30/134
(58) Field of Search .................... 30/134, 135; 606/174

(56) References Cited

U.S. PATENT DOCUMENTS 3,175,556 A * 3/1965 Wood et al. ................. 606/174
5,235,750 A * 8/1993 Brown ......................... 30/135
5,398,415 A * 3/1995 Collins ........................ 30/135

* cited by examiner

Primary Examiner—Douglas D. Watts
(74) Attorney, Agent, or Firm—Trexler, Bushnell, Giangiorgi, Blackstone & Marr, Ltd.

(57) ABSTRACT

A cutter for cutting cable, such as fiber optic cable, and a method of using same is provided. The cutter includes a pair of opposite members that are joined together at a joint such that the opposite members move in conjunction with each other. Each member has a handle on one side of the joint and a cutting blade on the opposite side of the joint. When the handles are forced together, the cutting blades are also forced together. The cutter also includes a clamping mechanism. The clamping mechanism is used to clamp the fiber optic cable on either side of the cutting blades such that the strength reinforcement strands of the fiber optic cable will be placed in tension, prior to the cutting of the strength reinforcement strands within the fiber optic cable, thereby ensuring a clean cut by the cutting blades.

31 Claims, 9 Drawing Sheets

CUTTER FOR FIBER OPTIC CABLE AND METHOD OF USING SAME

CROSS-REFERENCE

This patent application claims the benefit of domestic priority of U.S. Provisional Application Serial No. 60/260, 434, filed Jan. 9, 2001, and entitled "Improved Cutter For Fiber Optic Cable And Method Of Using Same".

BACKGROUND OF THE INVENTION

The present invention relates to a cutter for cutting fiber optic cable and a method of using same.

Fiber optic cables have become very popular such that they are being used to replace other types of cables in a variety of circumstances, i.e., telephone lines, cable television lines, etc. The cutting of fiber optic cables, though, has presented a problem to many workers because the tools that they use to cut other types of cable do not always cleanly cut the strength reinforcement strands, such as aramid, that run throughout fiber optic cables. The reason that the fiber optic cables do not cleanly cut appears to stem from the flexibleness of the fiber optic cables and the high tensile strength of the strength reinforcement strands. When a cutter that has been used in the past to cut other types of cable is used to cut fiber optic cable, the fine strength reinforcement strands appear to pull toward the blades of the cutter and bend between the blades instead of being cut by the blades. When a fiber optic cable does not cut cleanly, the worker is forced to pull the strength reinforcement strands apart or use a saw or knife to complete the cut. The pulling of the strength reinforcement strands by either the worker or the cutter, as well as completing the cut by a saw or a knife, can potentially cause damage to the fiber optic cable at some spot in the fiber optic cable that is not being cut.

Therefore, an improved cutter for cutting fiber optic cables is needed. The present invention provides such a cutter. Features and advantages of the present invention will become apparent upon a reading of the attached specification, in combination with a study of the drawings.

OBJECTS AND SUMMARY OF THE INVENTION

A primary object of the invention is to provide a cable cutter which cleanly cuts a cable, such as fiber optic cable, without having to use another tool to complete the cut.

Another object of the invention is to provide a cable cutter for cutting cable that prevents the cable from pulling toward the cutter blades and bending between the blades instead of being cut.

Yet another object of the invention is to provide a cable cutter that uses a clamping mechanism to place the strength reinforcement strands of a fiber optic cable in tension prior to cutting the cable in order to prevent the strength reinforcement strands from pulling into the gap between the blades.

Another object of the invention is to provide an improved method of cutting a cable.

Briefly, and in accordance with the foregoing, the present invention provides a cutter for cutting cable, such as fiber optic cable, and a method of using same. The cutter of the present invention includes a pair of opposite members that are joined together at a joint such that the opposite members move in conjunction with each other. Each member has a handle on one side of the joint and a cutting blade on the opposite side of the joint. When the handles are forced together, the cutting blades are also forced together. The cutter also includes a clamping mechanism. The clamping mechanism is used to clamp the fiber optic cable on either side of the cutting blades, prior to the cutting of strength reinforcement strands within the fiber optic cable, such that the strength reinforcement strands of the fiber optic cable will be placed in tension, thereby ensuring a clean cut of the entire fiber optic cable by the cutting blades.

BRIEF DESCRIPTION OF THE DRAWINGS

The features of the present invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENTS

Figure 1:
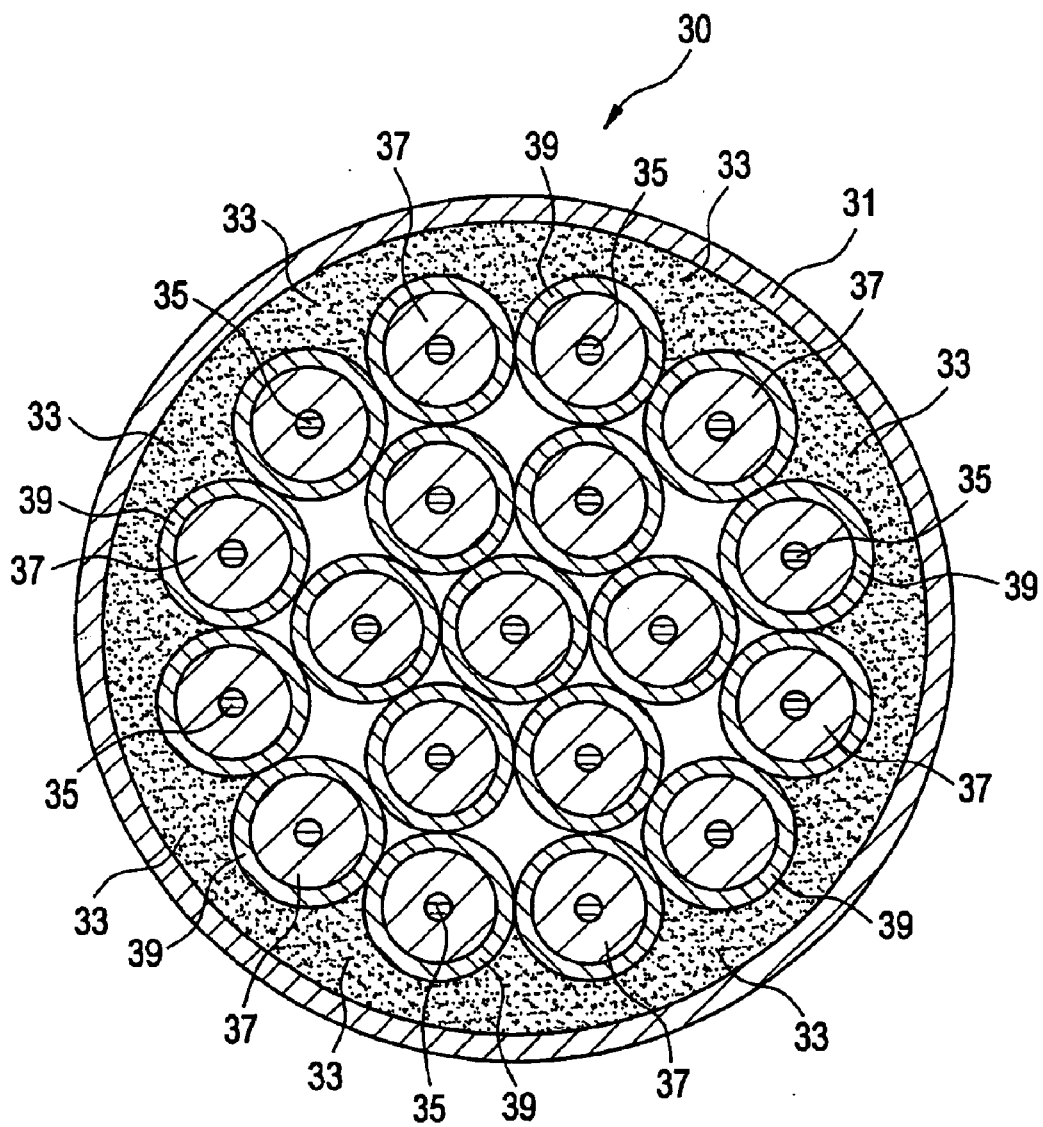
FIG. 1 is a cross-sectional view of a fiber optic cable.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated and described herein.

It should be noted that while the different embodiments of the present invention are described in relation to cable cutters for cutting fiber optic cable, other types of cable could also be effectively cut by using the cutters described herein and by using the methods of cutting described herein.

A fiber optic cable 30 is illustrated in FIG. 1. The fiber optic cable 30 has an outer jacket 31 that is commonly formed of polyethylene. The outer jacket 31 houses a plurality of strength reinforcement strands 33 made of suitable material such as aramid, and a plurality of optical fibers 35. The strength reinforcement strands 33 may be free floating within the outer jacket 31. Each optical fiber 35 is surrounded by a fiber coating 37 and, in turn, each fiber coating 37 is surrounded by a buffer member 39. The strength reinforcement strands 33 are typically provided between the outer jacket 31 and the buffer members 39, but could also be provided between the buffer members 39 and the optical fibers 35 along with the fiber coatings 37.

The strength reinforcement strands 33 provide strength to the fiber optic cable 30 as they have a high tensile strength. The cutter 110, 210, 310, 410 of the present invention cuts the fiber optic cable 30 having strength reinforcement strands 33 therein by clamping the strength reinforcement strands 33 and placing them in tension prior to cutting therethrough.

A first embodiment of the cable cutter 110 which incorporates features of the present invention is shown in FIGS. 2–5 with reference numerals being in the one hundreds. A second embodiment of the cable cutter 210 which incorporates features of the present invention is shown in FIGS. 6–9 with reference numerals being in the two hundreds. A third embodiment of the cable cutter 310 which incorporates features of the present invention is shown in FIGS. 10–13 with reference numerals being in the three hundreds. A fourth embodiment of the cable cutter 410 which incorporates features of the present invention is shown in FIGS. 14–17 with reference numerals being in the four hundreds.

Attention is invited to the first embodiment of the cable cutter 110 which is shown in FIGS. 2–5. The cable cutter 110 includes a pair of members 112, 114 that are connected together by a joint 116, such as a pin which extends through aligned apertures in the members 112, 114.

The first member 112 has an elongated handle portion 118 on one side of the joint 116 and a cutting portion 120 on the opposite side of the joint 116. The cutting portion 120 of the first member 112 further includes a blade 122 that is used to cut fiber optic cable 30.

The second member 114 also has an elongated handle portion 124 on one side of the joint 116 and a cutting portion 126 on the other side of the joint 116. The cutting portion 126 of the second member 114 further includes a blade 128 that is used to cut fiber optic cable 30.

Figure 5:
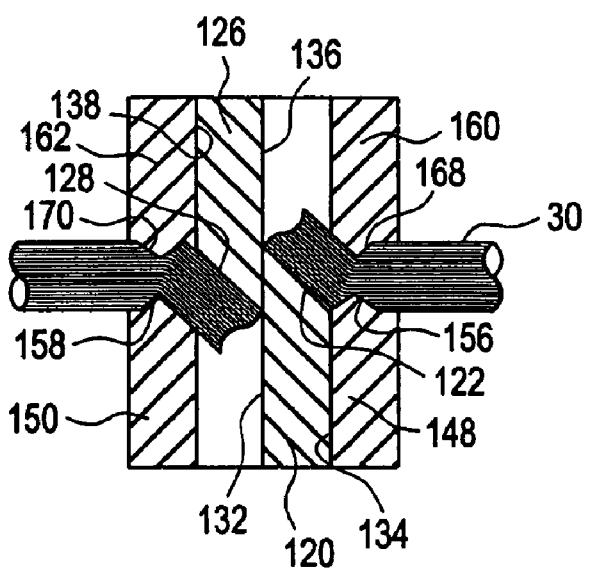
FIG. 5 is a cross-sectional view of the first embodiment of the cable cutter along line 5—5 of FIG. 4.

As seen in FIG. 5, the blades 122, 128 are offset from one another. The handles 118, 124 can either be offset from each other or can be planar depending on the desired structure.

The blade 122 and the blade 128 work in conjunction to cut a fiber optic cable 30 by shearing the fiber optic cable 30. As illustrated in FIG. 5, the end of the blade 122 is angled such that a first side 132 of the blade 122 that is proximate to the blade 128 is longer than a second side 134 of the blade 122 that is spaced from the blade 128. Similarly, the end of the blade 128 is angled such that a first side 136 of the blade 128 that is proximate to the blade 122 is longer than a second side 138 of the blade 128 that is spaced from the blade 122.

A normally expanded spring 140 is connected between the handle portion 118 of the first member 112 and the handle portion 124 of the second member 114. Thus, when the cutter 110 is at rest, the normally expanded spring 140 forces the handle portions 118, 124 away from one another. Because the handle portions 118, 124 are forced away from one another, the cutting portions 120, 126 and their associated blades 122, 128 are also forced away from one another.

The cable cutter 110 further includes a clamping mechanism 142. The clamping mechanism 142 includes a lower clamp 144 and an upper clamp 146. The lower clamp 144 extends around the side of the cutter 110 that is defined by the handle portion 124 and the cutting portion 120. The upper clamp 146 extends around the side of the cutter 110 that is defined by the handle portion 118 and the cutting portion 126. Springs are provided between the lower clamp 144 and the upper clamp 146 as discussed herein.

The lower clamp 144 includes a pair of jaw portions 148, 150, a pair of extending portions, only one of which is shown in the drawings as reference numeral 152, and a bridge portion 154.

The jaw portions 148, 150 are on the same side of the joint 116 as are the cutting portions 120, 126. Jaw portion 148 is proximate to the second side 134 of the blade 122 while jaw portion 150 is proximate to the first side 132 of the blade 122. The rear portion of each jaw 148, 150 has an aperture therethrough which aligns with the apertures through the members 112, 114 such that the lower clamp 144 is attached to the members 112, 114 by the pin 116. Jaw portions 148, 150 further have pointed ends 156, 158, respectively, to engage the fiber optic cable 30 as discussed herein.

The extending portions 152 are on the same side of the joint 116 as are the handle portions 118, 124. Extending portion 152 is on the same side of the cutter 110 as is jaw portion 148. The other extending portion (not shown, but identically shaped and formed) is on the same side of the cutter 110 as is jaw portion 150.

The bridge portion 154 is positioned between the jaw portion 148 and the extending portion 152 on one side of the cutter 110 and between the jaw portion 150 and the other extending portion (not shown) of the cutter 110 such that the bridge portion 154 extends around the cutter 110 below the joint 116.

The upper clamp 146 includes a pair of jaw portions 160, 162, a pair of extending portions, only one of which is shown in the drawings as reference numeral 164, and a bridge portion 166.

The jaw portions 160, 162 are on the same side of the joint 116 as are the cutting portions 120, 126. Jaw portion 160 is proximate to the first side 136 of the blade 128 while jaw portion 162 is proximate to the second side 138 of the blade 128. The rear portion of each jaw 160, 162 has an aperture therethrough which aligns with the apertures through the member 112, 114 and the apertures through the jaw portions 148, 150 such that the upper clamp 146 is attached to the lower clamp 144 by the pin 116. Jaw portions 160, 162 further have pointed ends 168, 170, respectively, to engage the fiber optic cable 30 as discussed herein.

The extending portions 164 are on the same side of the joint 116 as are the handle portions 118, 124. Extending portion 164 is on the same side of the cutter 110 as is jaw portion 160. The other extending portion (not shown, but identically shaped and formed) is on the same side of the cutter 110 as is jaw portion 162.

A pair of normally expanded springs 172, 174 connect the extending portion 152 to the extending portion 164. Likewise, a pair of normally expanded springs (not shown) connect the extending portions that are not shown. It should be understood that any further structure or function discussed with regard to the springs 172, 174 and/or the extending portions 152, 164 applies to the unseen springs and extending portions as well.

The bridge portion 166 is positioned between the jaw portion 160 and the extending portion 164 on one side of the cutter 110 and between the jaw portion 162 and the other extending portion (not shown) of the cutter 110 such that the bridge portion 166 extends around the cutter 110 above the joint 116.

The jaw portions 148, 150, 160, 162 extend outwardly from the joint 116 alongside the blades 122, 128. Jaw portions 148, 160 are in alignment with each other while jaw portions 150, 162 are in alignment with each other as shown in FIG. 5. The alignment of the jaw portions 148, 150, 160, 162 allows the jaw portions 148, 150, 160, 162 to work in conjunction to clamp the fiber optic cable 30.

Jaw portions 148, 160 and jaw portions 150, 162 are preferably set such that the angles between jaw portions 148, 160 and jaw portions 150, 162 are smaller than the angle between the blades 122, 128. Jaw portions 148, 160 and jaw portions 150, 162 are normally set at this position due to the bridge portion 154 of the lower clamp 144 and the bridge portion 166 of the upper clamp 146 and due to the normally expanded springs 172, 174. Because the springs 172, 174 are normally expanded, the extending portions 152, 164 are forced away from one another. By forcing the extending portions 152, 164 away from one another, the lower clamp 144 and the upper clamp 146 are pivoted about joint 116 such that jaw portions 148, 160 and jaw portions 150, 162 are forced toward one another. Jaw portions 148, 160 and jaw portions 150, 162 do not come into contact with one another because of the bridge portions 154, 166. Bridge portion 154 contacts cutting portion 120 and bridge portion 166 contacts cutting portion 126. Thus, the contact between the bridge portion 154 and cutting portion 120 and the contact between the bridge portion 166 and cutting portion 126 prohibits the jaw portions 148, 160 and the jaw portions 150, 162 from coming closer to each other unless the cutting portions 120, 126 are allowed to come closer together. Jaw portions 148, 160 and jaw portions 150, 162, though, will never cut through the fiber optic cable 30, as will the blades 122, 128, because jaw portions 148, 160 and jaw portions 150, 162 can only come as close to each other as is defined by the normally expanded springs 172, 174, which will only allow jaw portions 148, 160 and jaw portions 150, 162 to come close enough to each other to firmly clamp onto the fiber optic cable 30 without cutting the fiber optic cable 30.

Figure 2:
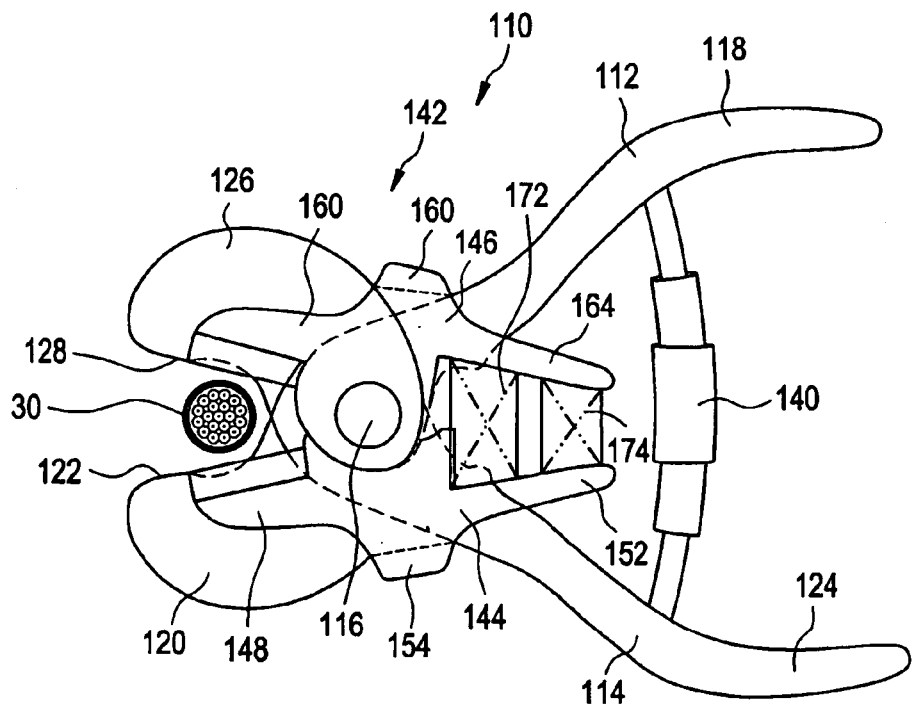
FIG. 2 is a side elevational view of a first embodiment of a novel cable cutter which incorporates features of the invention, such cable cutter being shown in an open condition.

Operation of the cable cutter 110 is shown in FIGS. 2–5. In FIG. 2, when the cable cutter 110 is in the open condition, the handle portions 118, 124 are forced away from each other because of the force of the spring 140. Because the handle portions 118, 124 are forced apart from each other, the cutting portions 120, 126 are also forced away from each other. Further, because the cutting portions 120, 126 are forced away from each other, the contact between the cutting portions 120, 126 and the bridge portions 154, 166, respectively, forces jaw portions 148, 160 and jaw portions 150, 162 away from each other and compresses the springs 172, 174. The user places the fiber optic cable 30 between the cutting portions 120, 126, jaw portions 148, 160 and jaw portions 150, 162.

Figure 3:
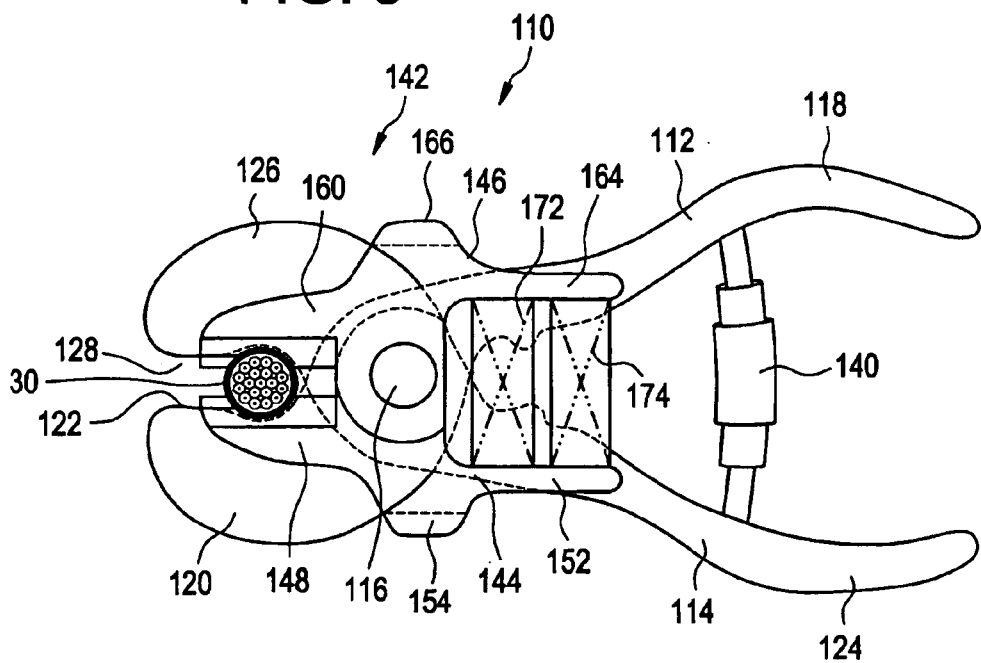
FIG. 3 is a side elevational view of the first embodiment of the cable cutter in a partially closed condition.

In FIG. 3, when the cable cutter 110 is in a partially closed condition, the handle portions 118, 124 are moved closer together by a user gripping the handle portions 118, 124 and squeezing, thus, compressing the spring 140 between the handle portions 118, 124. Because the handle portions 118, 124 are moved closer together, the cutting portions 120, 126 are also moved closer together, although the blades 122, 128 of the cutting portions 120, 126 have not yet begun to cut the fiber optic cable 30. This allows the springs 172, 174 to expand such that the bridge portions 154, 166 maintain contact with the cutting portions 120, 126, thereby allowing jaw portions 148, 160, and jaw portions 150, 162 to move closer together and to engage the fiber optic cable 30. By engaging the fiber optic cable 30, the lower and upper clamps 144, 146 place the strength reinforcement strands 33 of the fiber optic cable 30 into tension.

Figure 4:
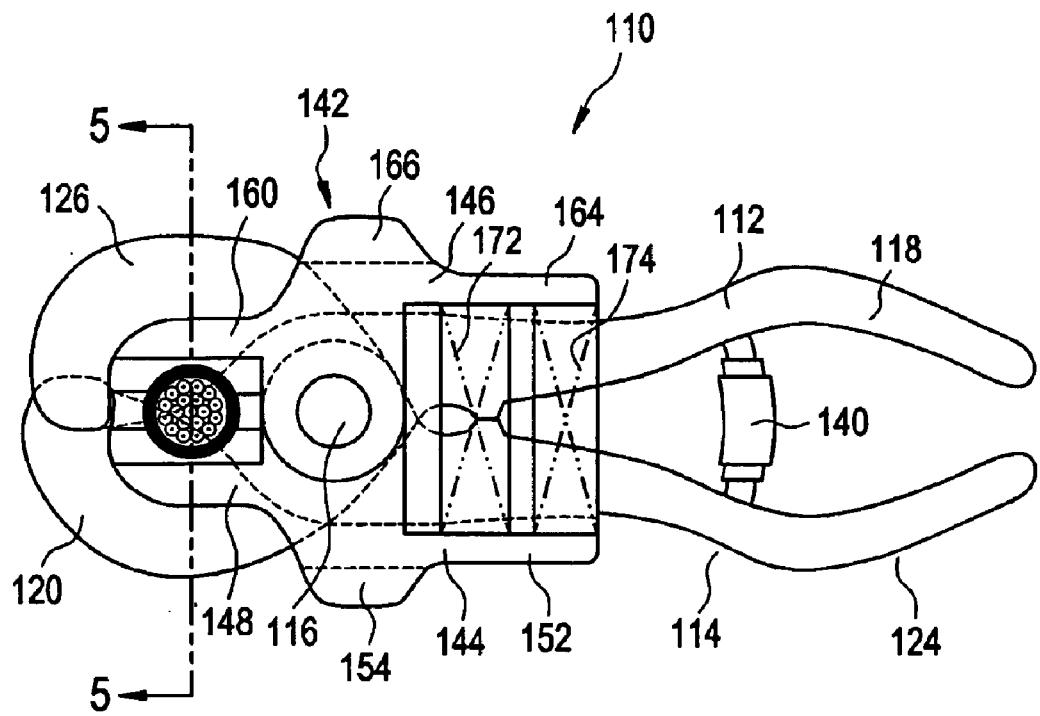
FIG. 4 is a side elevational view of the first embodiment of the cable cutter in a completely closed condition.

In FIGS. 4 and 5, when the cutter 110 is in the closed condition, the user has continued to squeeze the handle portions 118, 124 further together, thus forcing the cutting portions 120, 126 to come closer together. It should be noted that at this point, cutting portions 120, 126 move while jaw portions 148, 160 and jaw portions 150, 162 do not move because the bridge portions 154, 166 are no longer forced against the cutting portions 120, 126 as they move closer together because the springs 172, 174 have already been fully expanded. As the cutting portions 120, 126 come closer together, the blades 122, 128 come into contact with the fiber optic cable 30 and, working together, the blades 122, 128 cut through the outer jacket 31 and through the strength reinforcement strands 33, the buffer members 39, the fiber coatings 37 and the optic fibers 35 of the fiber optic cable 30.

When the handle portions 118, 124 are released, the spring 140 begins to return to its normally expanded position shown in FIG. 2, thus forcing the handle portions 118, 124 and the cutting portions 120, 126 to move away from one another. As the cutting portions 120, 126 return to the position as shown in FIG. 3, the bridge portions 154, 166 reengage with the cutting portions 120, 126. As the cutting portions 120, 126 move from the partially closed condition of FIG. 3 to the open condition of FIG. 2, the cutting portions 120, 126 exert a force on the bridge portions 154, 166 such that the springs 172, 174 are compressed together, thus allowing for jaw portions 148, 160 and jaw portions 150, 162 to move away from one another. Because the cutting portions 120, 126, jaw portions 148, 160 and jaw portions 150, 162 are then opened, the fiber optic cable 30, which is now cut, is able to be removed so that the user can do any necessary work that needs to be done with the fiber optic cable 30.

Attention is invited to the second embodiment of the cable cutter 210 which is shown in FIGS. 6–9. The cable cutter 210 includes a pair of members 212, 214 that are connected together by a joint 216, such as a pin which extends through aligned apertures in the members 212, 214.

The first member 212 has an elongated handle portion 218 on one side of the joint 216 and a cutting portion 220 on the opposite side of the joint 216. The cutting portion 220 of the first member 212 further includes a blade 222 that is used to cut fiber optic cable 30.

The second member 214 also has an elongated handle portion 224 on one side of the joint 216 and a cutting portion 226 on the other side of the joint 216. The cutting portion 226 of the second member 214 further includes a blade 228 that is used to cut fiber optic cable 30.

Figure 9:
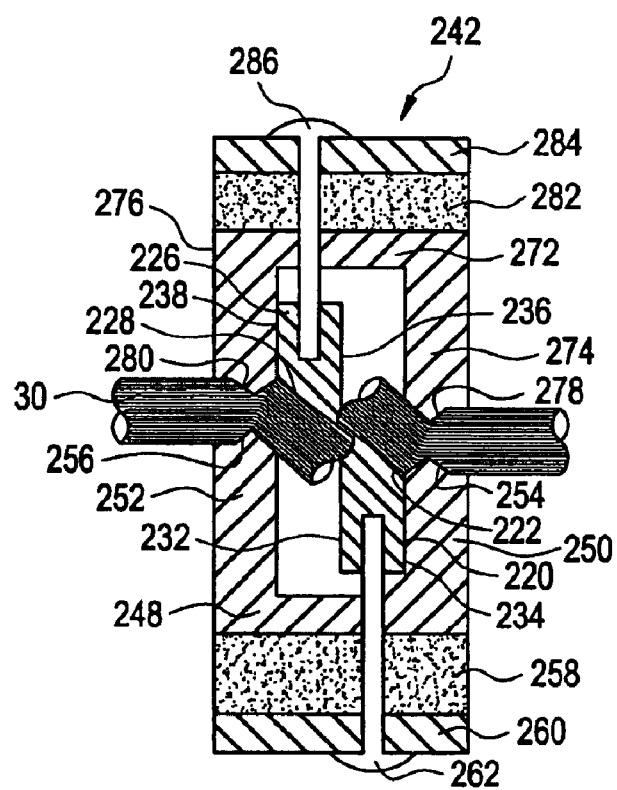
FIG. 9 is a cross-sectional view of the second embodiment of the cable cutter along line 9—9 of FIG. 8.

As seen in FIG. 9, the blades 222, 228 are offset from one another. The handles 218, 224 can either be offset from each other or can be planar depending on the desired structure.

The blade 222 and the blade 228 work in conjunction to cut a fiber optic cable 30 by shearing the fiber optic cable 30.

As illustrated in FIG. 9, the end of the blade 222 is angled such that a first side 232 of the blade 222 that is proximate to the blade 228 is longer than a second side 234 of the blade 222 that is spaced from the blade 228. Similarly, the end of the blade 228 is angled such that a first side 236 of the blade 228 that is proximate to the blade 222 is longer than a second side 238 of the blade 228 that is spaced from the blade 222.

The cable cutter 210 further includes a clamping mechanism 242. The clamping mechanism 242 includes a lower clamp 244 and an upper clamp 246. Both the lower clamp 244 and the upper clamp 246 are generally U-shaped such that they extend around opposite sides of the cutter 210. The lower clamp 244 extends around the side of the cutter 210 that is defined by the handle portion 224 and the cutting portion 220. The upper clamp 246 extends around the side of the cutter 210 that is defined by the handle portion 218 and the cutting portion 226. Both the lower clamp 244 and the upper clamp 246 are situated on the same side of the joint 216 as are the cutting portions 220, 226.

The lower clamp 244 includes a base member 248 and a pair of jaw portions 250, 252 extending therefrom and perpendicularly thereto. The base member 248 extends below the cutting portion 220 with the jaw portions 250, 252 extending on either side of the cutting portion 220. Jaw portion 250 is proximate to the second side 234 of the blade 222 while jaw portion 252 is proximate to the first side 232 of the blade 222. Jaw portions 250, 252 have, respectively, pointed ends 254, 256 to engage the fiber optic cable 30.

The lower clamp 244 further includes a rubber pad 258 and a steel plate 260. A top of the rubber pad 258 is connected to a bottom of the base member 248. A top of the steel plate 260 is connected to a bottom of the rubber pad 258.

The lower clamp 244 further includes at least one member 262, preferably a screw. The member 262 is inserted through an aperture through the steel plate 260 such that a first end of the member 262 is fixedly attached to the steel plate 260. The member 262 also extends through an aperture through the rubber pad 258 and an aperture through the base member 248. A second end of the member 262 is fixedly attached to the cutting portion 220 within an aperture. The member 262 is not fixedly attached to the rubber pad 258 or the base member 248.

The upper clamp 246 includes a base member 272 and a pair of jaw portions 274, 276 extending therefrom and perpendicularly thereto. The base member 272 extends above the cutting portion 226 with the jaw portions 274, 276 extending on either side of the cutting portion 226. Jaw portion 274 is proximate to the first side 236 of the blade 228 while jaw portion 276 is proximate to the second side 238 of the blade 228. Jaw portions 274, 276 have, respectively, pointed ends 278, 280 to engage the fiber optic cable 30.

Jaw portions 250, 274 are in alignment with each other while jaw portions 252, 276 are in alignment with each other as shown in FIG. 9. The alignment of the jaw portions 250, 252, 274, 276 allows the jaw portions 250, 252, 274, 276 to work in conjunction to clamp the fiber optic cable 30.

Jaw portions 250, 274 and jaw portions 252, 276 are preferably set such that the angles between jaw portions 250, 274 and jaw portions 252, 276 are smaller than the angle between the blades 222, 228.

The upper clamp 246 further includes a rubber pad 282 and a steel plate 284. A bottom of the rubber pad 282 is connected to a top of the base member 272. A bottom of the steel plate 284 is connected to a top of the rubber pad 282.

The upper clamp 246 further includes at least one member 286, preferably a screw. The member 286 is inserted through an aperture through the steel plate 284 such that a first end of the member 286 is fixedly attached to the steel plate 284. The member 286 also extends through an aperture through the rubber pad 282 and an aperture through the base member 272. A second end of the member 286 is fixedly attached to the cutting portion 226 within an aperture. The member 286 is not fixedly attached to the rubber pad 282 or the base member 272.

Because the clamps 244, 246 are connected to the cutting portions 220, 226 by the members 262, 286, the jaw portions 250, 252, 274, 276 move in conjunction with the blades 222, 228. The jaw portions 250, 252, 274, 276 will come into contact with the fiber optic cable 30 before the blades 222, 228 as the jaw portions 250, 252, 274, 276 are set at a smaller angle than are the blades 222, 228.

Figure 6:
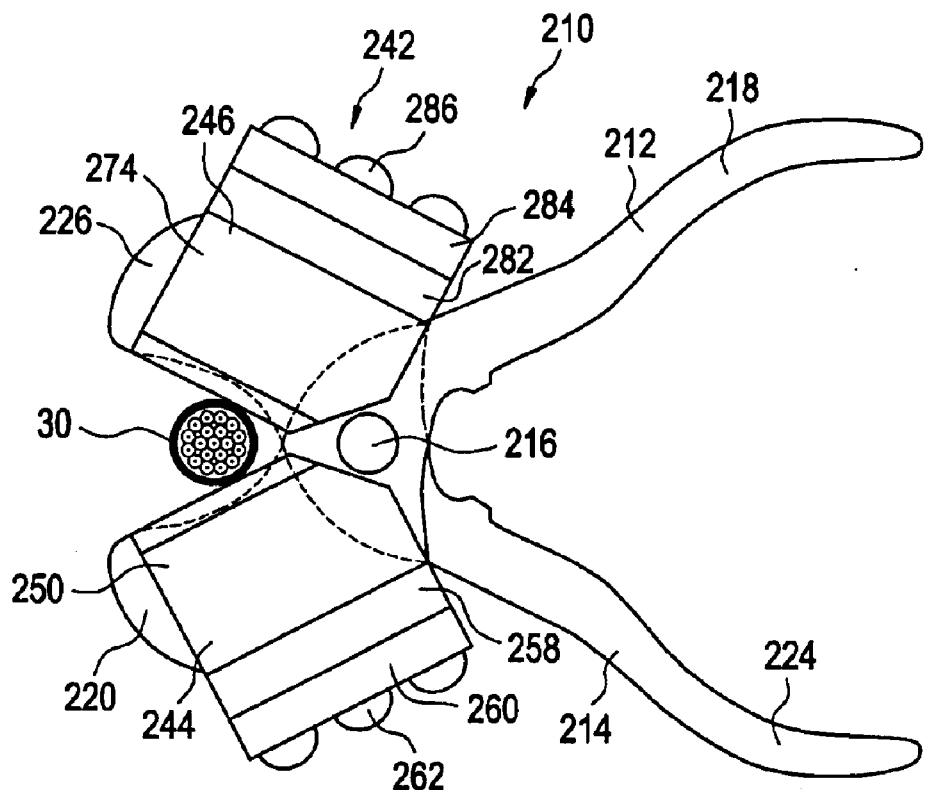
FIG. 6 is a side elevational view of a second embodiment of a novel cable cutter which incorporates features of the invention, such cable cutter being shown in an open condition.

Operation of the cable cutter 210 is shown in FIGS. 6–9. In FIG. 6, when the cable cutter 210 is in the open condition, the handle portions 218, 224 are extended away from each other thus forcing the cutting portions 220, 226 to be forced away from each other. Because the cutting portions 220, 226 are forced away from each other, jaw portions 250, 274 and jaw portions 252, 276 are also forced away from each other. The user places a fiber optic cable 30 between the cutting portions 220, 226, jaw portions 250, 274 and jaw portions 252, 276.

Figure 7:
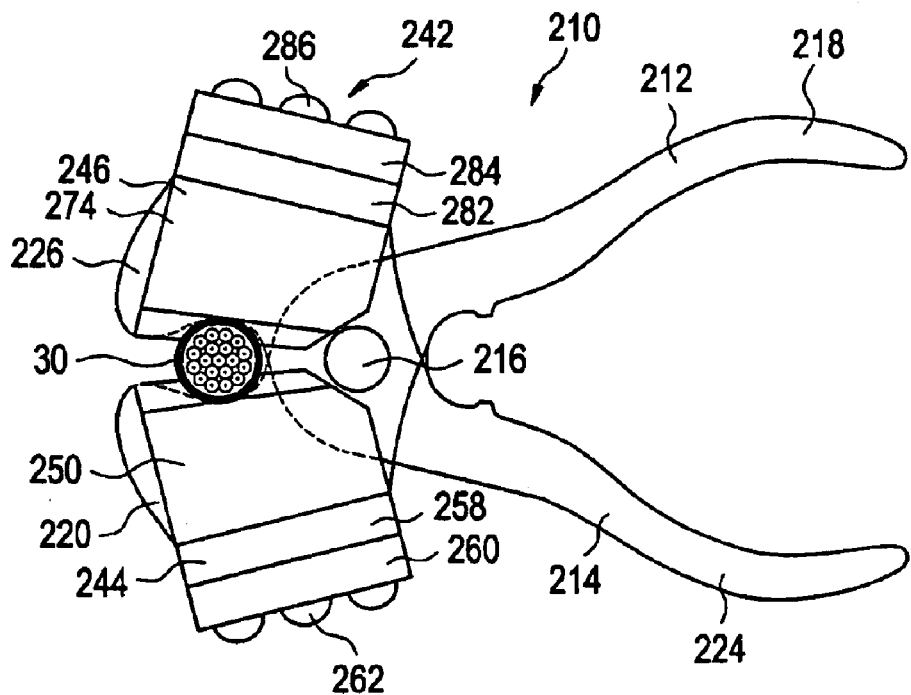
FIG. 7 is a side elevational view of the second embodiment of the cable cutter in a partially closed condition.

In FIG. 7, when the cable cutter 210 is in a partially closed condition, the handle portions 218, 224 are moved closer together by a user gripping the handle portions 218, 224 and squeezing. Because the handle portions 218, 224 are moved closer together, the cutting portions 220, 226 are also moved closer together, although the blades 222, 228 of the cutting portions 220, 226 have not yet begun to cut the fiber optic cable 30. The cutting portions 220, 226 pull the members 262, 286 with them, thus pulling the steel plates 260, 284 toward each other. The steel plates 260, 284 put a force on the rubber pads 258, 282 and thus on the base members 248, 272 and the jaw portions 250, 274 and the jaw portions 252, 276. Jaw portions 250, 274 and jaw portions 252, 276 clamp onto the fiber optic cable 30 with the pointed ends 254, 256, 278, 280 engaging the fiber optic cable 30. By engaging the fiber optic cable 30, jaw portions 250, 274 and jaw portions 252, 276 place the strength reinforcement strands 33 of the fiber optic cable 30 into tension.

Figure 8:
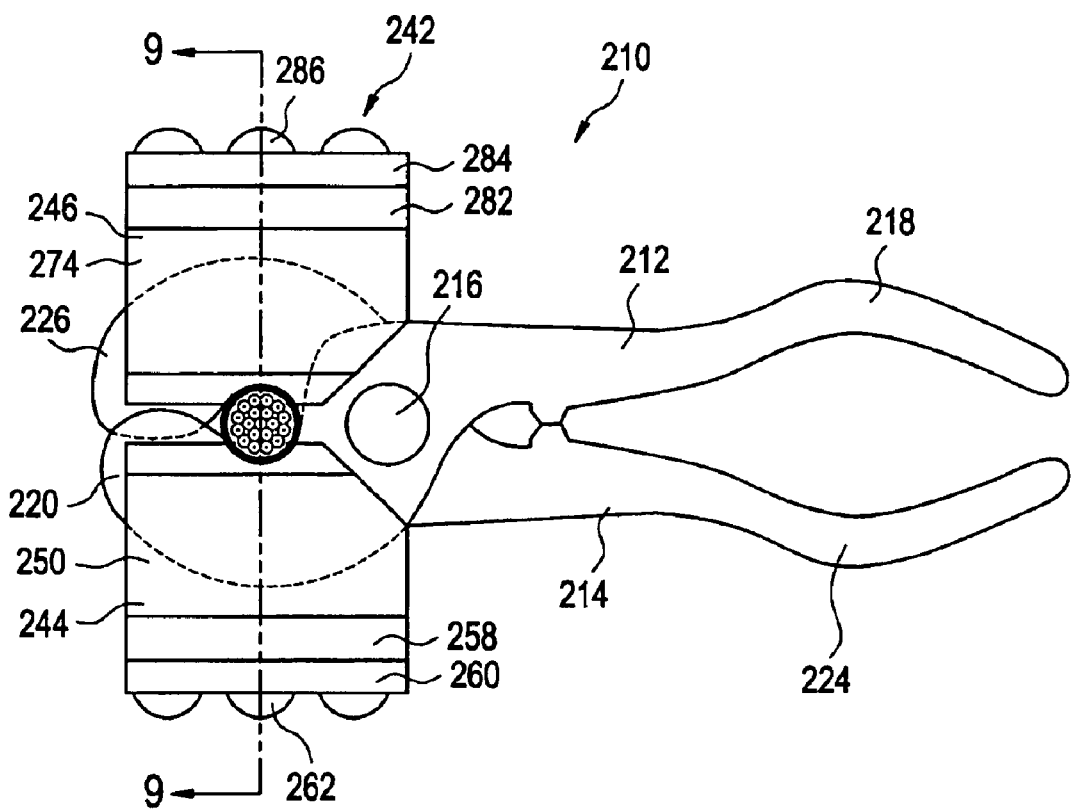
FIG. 8 is a side elevational view of the second embodiment of the cable cutter in a completely closed condition.

In FIGS. 8 and 9, when the cutter 210 is in the closed condition, the user has continued to squeeze the handle portions 218, 224 further together, thus forcing the cutting portions 220, 226 to come further together. It should be noted that at this point, cutting portions 220, 226 move while the jaw portions 250, 252, 274, 276 do not move because the jaw portions 250, 252, 274, 276 continue to exert a clamping force on the fiber optic cable 30, thus compressing the rubber pads 258, 282. At the same time, the cutting portions 220, 226 are pulled away from the clamps 244, 246, thus creating spaces between the cutting portions 220, 226 and the clamps 244, 246. As the cutting portions 220, 226 come closer together, the blades 222, 228 come into contact with the fiber optic cable 30 and, working together, the blades 222, 228 cut through the outer jacket 31 and through the strength reinforcement strands 33, the buffer members 39, the fiber coatings 37 and the optic fibers 35 of the fiber optic cable 30.

After the cut of the fiber optic cable 30 is made, the user then pulls the handle portions 218, 224 apart, returning the cutter 210 to its open position as shown in FIG. 6. The user is then free to remove the fiber optic cable 30, which is now cut, to do any necessary work that needs to be done with the fiber optic cable 30.

Attention is invited to the third embodiment of the cable cutter 310 which is shown in FIGS. 10–13. The cable cutter 310 includes a pair of members 312, 314 that are connected together by a joint 316, such as a pin which extends through aligned apertures in the members 312, 314.

The first member 312 has an elongated handle portion 318 on one side of the joint 316 and a cutting portion 320 on the opposite side of the joint 316. The cutting portion 320 of the first member 312 further includes a blade 322 that is used to cut fiber optic cable 30.

The second member 314 also has an elongated handle portion 324 on one side of the joint 316 and a cutting portion 326 on the other side of the joint 316. The cutting portion 326 of the second member 314 further includes a blade 328 that is used to cut fiber optic cable 30.

Figure 13:
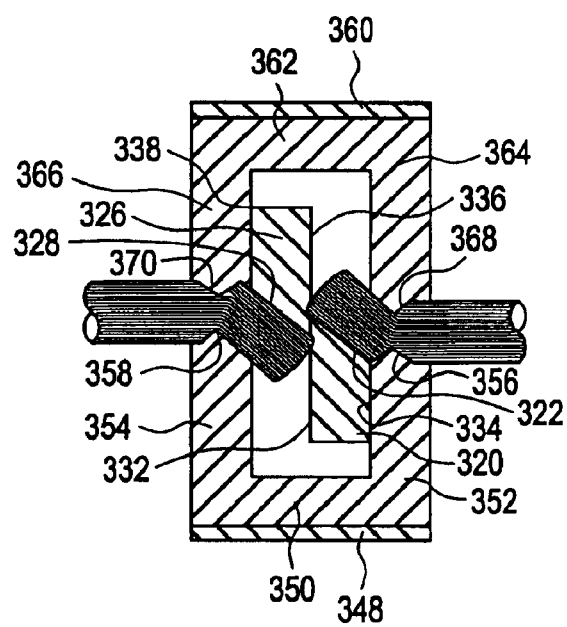
FIG. 13 is a cross-sectional view of the third embodiment of the cable cutter along line 13—13 of FIG. 12.

As seen in FIG. 13, the blades 322, 328 are offset from one another. The handles 318, 324 can either be offset from each other or can be planar depending on the desired structure.

The blade 322 and the blade 328 work in conjunction to cut a fiber optic cable 30 by shearing the fiber optic cable 30. As illustrated in FIG. 13, the end of the blade 322 is angled such that a first side 332 of the blade 322 that is proximate to the blade 328 is longer than a second side 334 of the blade 322 that is spaced from the blade 328. Similarly, the end of the blade 328 is angled such that a first side 336 of the blade 328 that is proximate to the blade 322 is longer than a second side 338 of the blade 328 that is spaced from the blade 322.

The cable cutter 310 further includes a clamping mechanism 342. The clamping mechanism 342 includes a lower clamp 344 and an upper clamp 346. The lower clamp 344 extends around the side of the cutter 310 that is defined by the handle portion 324 and the cutting portion 320. The upper clamp 346 extends around the side of the cutter 310 that is defined by the handle portion 318 and the cutting portion 326.

The lower clamp 344 includes an arm 348 which is preferably made of spring steel. A first end of the arm 348 is connected to the handle portion 324 by suitable means. A second end of the arm 348 is positioned below the cutting portion 320.

The lower clamp 344 further includes a base member 350 and jaw portions 352, 354 that extend therefrom and perpendicularly thereto. The base member 350 is attached to the second end of the arm 348. Jaw portions 352, 354 are on the same side of the joint 316 as are the cutting portions 320, 326. Jaw portion 352 is proximate to the second side 334 of the blade 322 while jaw portion 354 is proximate to the first side 332 of the blade 322. Jaw portions 352, 354 further have pointed ends 356, 358, respectively, to engage the fiber optic cable 30.

The upper clamp 346 includes an arm 360 which is preferably made of spring steel. A first end of the arm 360 is connected to the handle portion 318 by suitable means. A second end of the arm 360 is positioned above the cutting portion 326.

The upper clamp 346 further includes a base member 362 and jaw portions 364, 366 that extend therefrom and perpendicularly thereto. The base member 362 is attached to the second end of the arm 360. Jaw portions 364, 366 are on the same side of the joint 316 as are the cutting portions 320, 326. Jaw portion 364 is proximate to the first side 336 of the blade 328 while jaw portion 366 is proximate to the second side 338 of the blade 328. Jaw portions 364, 366 further have pointed ends 368, 370, respectively, to engage the fiber optic cable 30.

Jaw portions 352, 364 are in alignment with each other while jaw portions 354, 366 are in alignment with each other as shown in FIG. 13. The alignment of jaw portions 352, 354, 364, 366 allows the jaw portions 352, 354, 364, 366 to work in conjunction to clamp the fiber optic cable 30.

Jaw portions 352, 364 and jaw portions 354, 366 do not come into contact with one another, though, because of the spring steel arms 348, 360 as the spring steel arms 348, 360 are at their normal positions, no tension, prior to jaw portions 352, 364 and jaw portions 354, 366 coming into contact with one another.

Jaw portions 352, 364 and jaw portions 354, 366 also will never cut through the fiber optic cable 30, as will the blades 322, 328, because jaw portions 352, 364 and jaw portions 354, 366 can only come as close to each other as is defined by the spring force of the spring steel arms 348, 360, which will only allow jaw portions 352, 364 and jaw portions 354, 366 to come close enough to each other to firmly clamp onto the fiber optic cable 30 without cutting the fiber optic cable 30.

Figure 10:
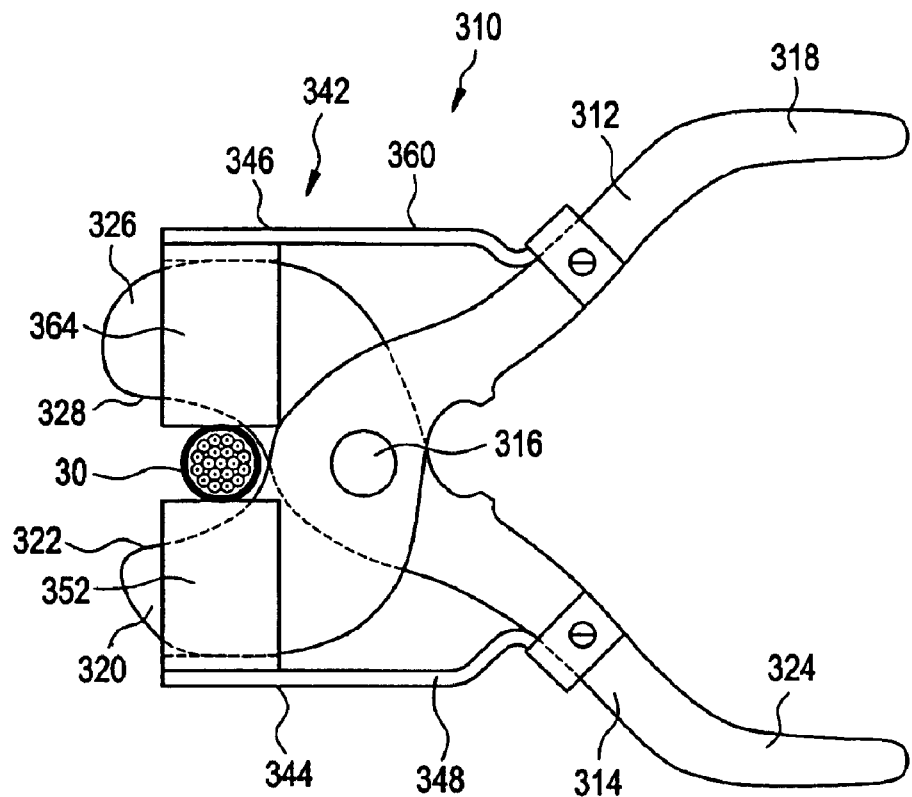
FIG. 10 is a side elevational view of a third embodiment of a novel cable cutter which incorporates features of the invention, such cable cutter being shown in an open condition.

Operation of the cable cutter 310 is shown in FIGS. 10–13. In FIG. 10, when the cable cutter 310 is in the open condition, handle portions 318, 324 are extended away from each other, thus forcing the cutting portions 320, 326 to be forced away from each other. When the cutting portions 320, 326 are forced away from each other, the base members 350, 362 abut against the cutting portions 320, 326, thus forcing jaw portions 352, 364 and jaw portions 354, 366 away from each other because the arms 348, 360 are flexed away from their normal rest position. It should be noted that in the open condition, jaw portions 352, 364 and jaw portions 354, 366 are closer to each other than are blades 322, 328. Because the cutting portions 320, 326, jaw portions 352, 364 and jaw portions 354, 366 are forced away from each other, the user is able to place a fiber optic cable 30 between the cutting portions 320, 326, jaw portions 352, 364 and jaw portions 354, 366.

Figure 11:
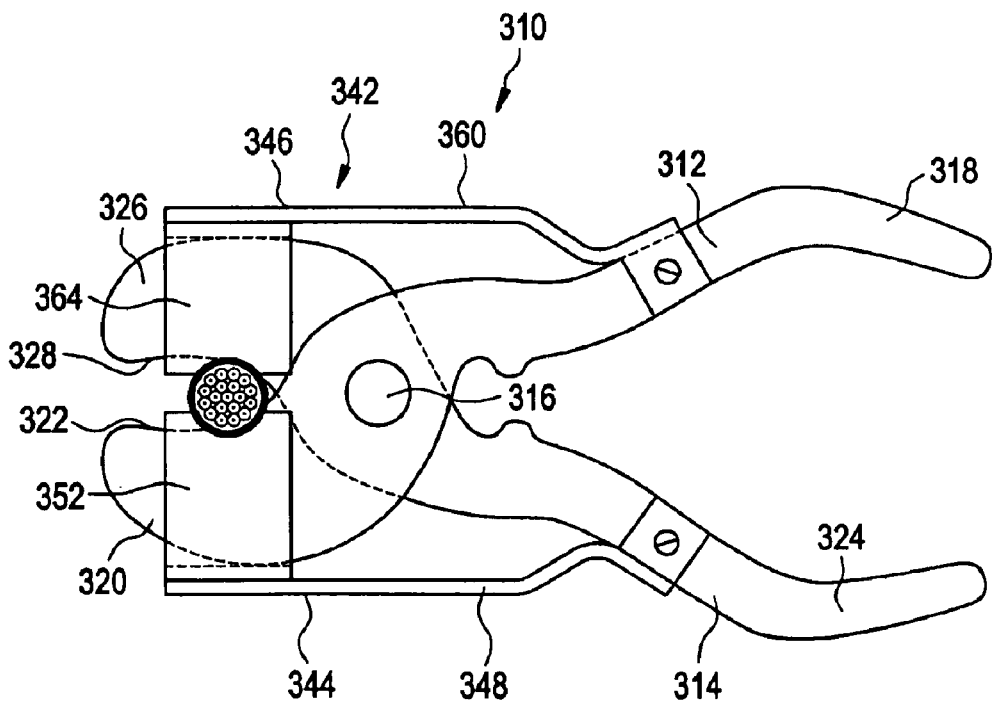
FIG. 11 is a side elevational view of the third embodiment of the cable cutter in a partially closed condition.

In FIG. 11, when the cable cutter 310 is in a partially closed condition, the handle portions 318, 324 are moved closer together by the user gripping the handle portions 318, 324 and squeezing. Because the handle portions 318, 324 are moved closer together, the cutting portions 320, 326 are also moved closer together, although the blades 322, 328 of the cutting portions 320, 326 have not yet begun to cut the fiber optic cable 30. Because the cutting portions 320, 326 are moved closer together, the arms 348, 360 move with the cutting portions 320, 326, thus forcing the jaw portions 352, 354, 364, 366 to move closer together to clamp onto the fiber optic cable 30 with the pointed ends 356, 358, 368, 370. By engaging the fiber optic cable 30, the jaw portions 352, 354, 364, 366 place the strength reinforcement strands 33 of the fiber optic cable 30 into tension.

Figure 12:
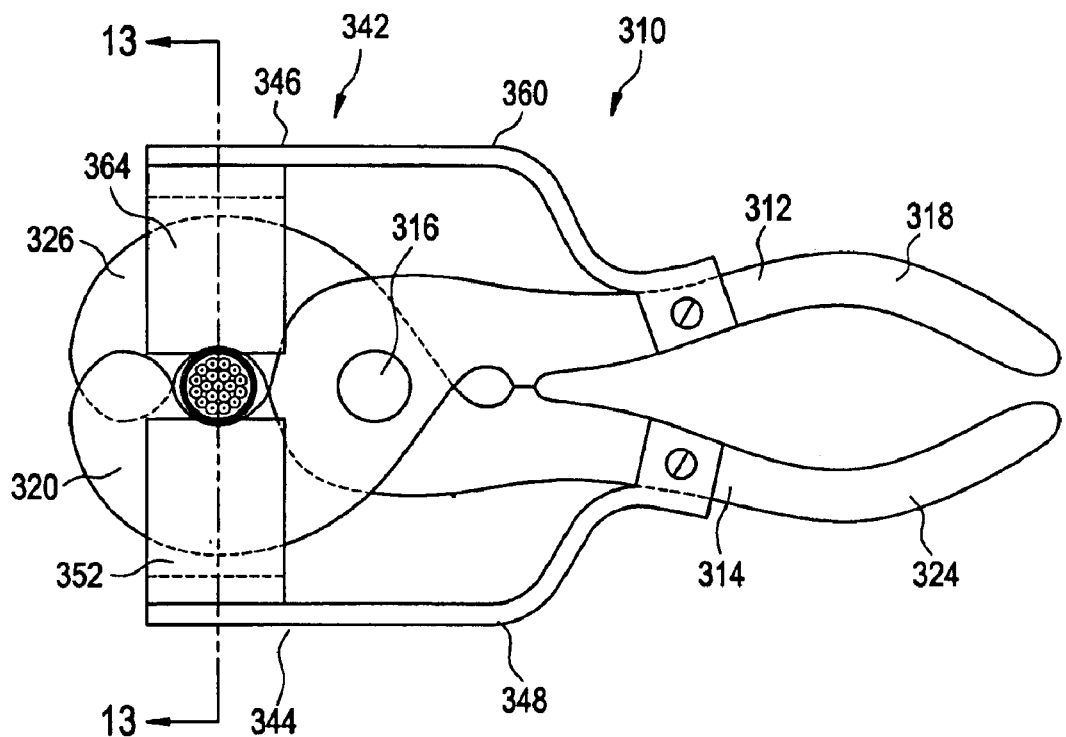
FIG. 12 is a side elevational view of the third embodiment of the cable cutter in a completely closed condition.

In FIGS. 12–13, when the cutter 310 is in the closed condition, the user has continued to squeeze the handle portions 318, 324 further together, thus forcing the cutting portions 320, 326 to come closer together. It should be noted that at this point, cutting portions 320, 326 move while the jaw portions 352, 354, 364, 366 do not move because the base members 350, 362 are no longer forced against the cutting portions 320, 326 by the arms 348, 360 as they move closer together because the arms 348, 360 have reached their equilibrium points. As the cutting portions 320, 326 come closer together, spaces are created between the blades 322, 328 and the base members 350, 362 as the blades 322, 328 come into contact with the fiber optic cable 30 and, working together, the blades 322, 328 cut through the outer jacket 31 and through the strength reinforcement strands 33, the buffer members 39, the fiber coatings 37 and the optic fibers 35 of the fiber optic cable 30.

After the cut of the fiber optic cable 30 is made, the user then pulls the handle portions 318, 324 apart, returning the cutter 310 to its open position as shown in FIG. 10. The user is then free to remove the fiber optic cable 30, which is now cut, to do any necessary work that needs to be done with the fiber optic cable 30.

Attention is invited to the fourth embodiment of the cable cutter 410 which is shown in FIGS. 14–17. The cable cutter 410 includes a pair of members 412, 414 that are connected together by a joint 416, such as a pin, which extends through aligned apertures in the members 412, 414.

The first member 412 has an elongated handle portion 418 on one side of the joint 416 and a cutting portion 420 on the opposite side of the joint 416. The cutting portion 420 of the first member 412 further includes a blade 422 that is used to cut fiber optic cable 30.

The second member 414 also has an elongated handle portion 424 on one side of the joint 416 and a cutting portion 426 on the other side of the joint 416. The cutting portion 426 of the second member 414 further includes a blade 428 that is used to cut fiber optic cable 30.

Figure 17:
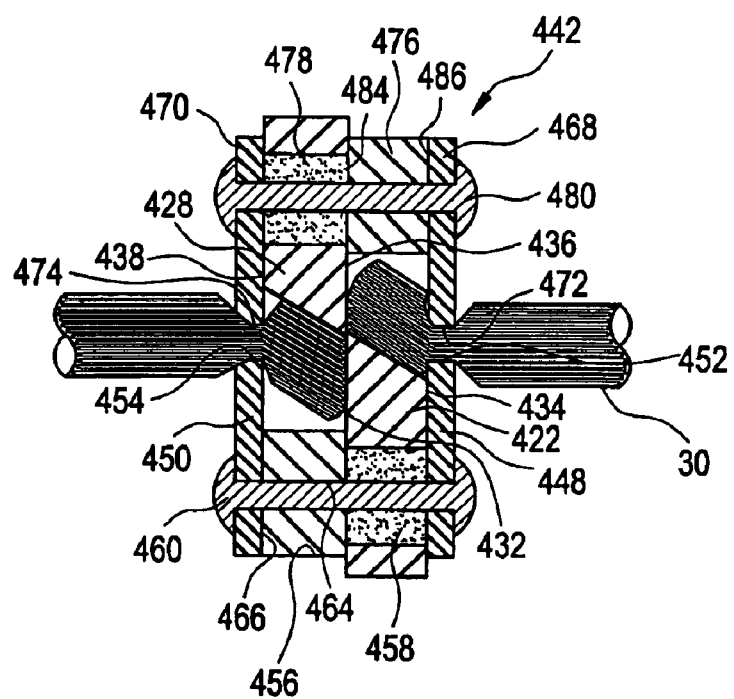
FIG. 17 is a cross-sectional view of the fourth embodiment of the cable cutter along line 17—17 of FIG. 16.

As seen in FIG. 17, the blades 422, 428 are offset from one another. The handles 418, 424 can either be offset from each other or can be planar depending on the desired structure.

The blade 422 and the blade 428 work in conjunction to cut a fiber optic cable 30 by shearing the fiber optic cable 30. As illustrated in FIG. 17, the end of the blade 422 is angled such that a first side 432 of the blade 422 that is proximate to the blade 428 is longer than a second side 434 of the blade 422 that is spaced from the blade 428. Similarly, the end of the blade 428 is angled such that a first side 436 of the blade 428 that is proximate to the blade 422 is longer than a second side 438 of the blade 428 that is spaced from the blade 422.

The cable cutter 410 further includes a clamping mechanism 442. The clamping mechanism 442 includes a lower clamp 444 and an upper clamp 446. Both the lower clamp 444 and the upper clamp 446 are situated on the same side of the joint 416 as are the cutting portions 420, 426.

The lower clamp 444 includes a pair of jaw portions 448, 450. The jaw portions 448, 450 extend on either side of the cutting portion 420. Jaw portion 448 is proximate to the second side 434 of the blade 422 while jaw portion 450 is proximate to the first side 432 of the blade 422. Jaw portions 448, 450 have, respectively, ends 452, 454 to engage the fiber optic cable 30.

The lower clamp 444 further includes a pair of spacers, only one of which is shown in the drawings as reference numeral 456, which are preferably made of metal, a pair of rubber bushings, only one of which is shown in the drawings as reference numeral 458, and a pair of connecting members 460, 462.

The rubber bushing 458 is situated within an aperture of the cutting portion 420 while the other rubber bushing (not shown) is situated within another aperture of the cutting portion 420. The rubber bushings 458 also are provided with apertures therethrough.

A second side 464 of the spacer 456 is positioned adjacent to the first side 432 of the blade 422 and is provided with an aperture therethrough. The aperture of the spacer 456 is in alignment with the aperture through the rubber bushing 458. Similarly, a second side of the other spacer (not shown) is positioned adjacent to the first side 432 of the blade 422 and is provided with an aperture therethrough. The aperture of the other spacer is in alignment with the aperture through the other rubber bushing.

The jaw portion 448 is positioned adjacent to the second side 434 of the blade 422 and is provided with a pair of apertures therethrough. One of the apertures of the jaw portion 448 is in alignment with the aperture through the rubber bushing 458 while the other aperture is in alignment with the aperture through the other rubber bushing.

The jaw portion 450 is positioned adjacent to first sides 466 of the spacers 456 and is provided with a pair of apertures therethrough. One of the apertures of the jaw portion 450 is in alignment with the aperture through the spacer 456 while the other aperture is in alignment with the aperture through the other spacer.

The connecting member 460 extends through the aperture of the jaw portion 448, through the aperture of the rubber bushing 458 which is housed within the aperture of the cutting portion 420, through the aperture of the spacer 456, and through the aperture of the jaw portion 450, thus connecting the jaw portions 448, 450, the spacer 456 and the cutting portion 420 together. Similarly, the connecting member 462 extends through the other aperture of the jaw portion 448, through the aperture of the other rubber bushing which is housed within the other aperture of the cutting portion 420, through the aperture of the other spacer, and through the other aperture of the jaw portion 450, thus connecting the jaw portions 448, 450, the spacers 456, the rubber bushings 458, and the cutting portion 420 together. The spacers 456 have a width which is commensurate with a width of the blade 428 such that the jaw portion 450 does not align with the blade 428.

The upper clamp 446 includes a pair of jaw portions 468, 470. The jaw portions 468, 470 extend on either side of the cutting portion 426. Jaw portion 468 is proximate to the first side 436 of the blade 428 while the jaw portion 470 is proximate to the second side 438 of the blade 428. Jaw portions 468, 470 have, respectively, ends 472, 474 to engage the fiber optic cable 30.

The upper clamp 446 further includes a pair of spacers, only one of which is shown in the drawings as reference numeral 476, a pair of rubber bushings, only one of which is shown in the drawings as reference numeral 478, and a pair of connecting members 480, 482.

The rubber bushing 478 is situated within an aperture of the cutting portion 426 while the other rubber bushing (not shown) is situated within another aperture of the cutting portion 426. The rubber bushings 478 also are provided with apertures therethrough.

A second side 484 of the spacer 476 is positioned adjacent to the first side 436 of the blade 428 and is provided with an aperture therethrough. The aperture of the spacer 476 is in alignment with the aperture through the rubber bushing 478. Similarly, a second side of the other spacer (not shown) is positioned adjacent to the first side 436 of the blade 428 and is provided with an aperture therethrough. The aperture of the other spacer is in alignment with the aperture through the other rubber bushing.

The jaw portion 470 is positioned adjacent to the second side 438 of the blade 428 and is provided with a pair of apertures therethrough. One of the apertures of the jaw portion 470 is in alignment with the aperture through the rubber bushing 478 while the other aperture is in alignment with the aperture through the other rubber bushing.

The jaw portion 468 is positioned adjacent to first sides 486 of the spacers 476 and is provided with a pair of apertures therethrough. One of the apertures of the jaw portion 468 is in alignment with the aperture through the spacer 476 while the other aperture is in alignment with the aperture through the other spacer.

The connecting member 480 extends through the aperture of the jaw portion 470, through the aperture of the rubber bushing 478 which is housed within the aperture of the cutting portion 426, through the aperture of the spacer 476, and through the aperture of the jaw portion 468., thus connecting the jaw portions 468, 470, the spacer 476 and the cutting portion 426 together. Similarly, the connecting member 482 extends through the other aperture of the jaw portion 470, through the aperture of the other rubber bushing which is housed within the other aperture of the cutting portion 426, through the aperture of the other spacer, and through the other aperture of the jaw portion 468, thus connecting the jaw portions 468, 470, the spacers 476, the rubber bushings 478, and the cutting portion 426 together. The spacers 476 have a width which is commensurate with a width of the blade 422 such that the jaw portion 468 does not align with the blade 422.

Jaw portions 448, 468 are in alignment with each other while jaw portions 450, 470 are in alignment with each other as shown in FIG. 17. The alignment of the jaw portions 448, 450, 468, 470 allows the jaw portions 448, 450, 468, 470 to work in conjunction to clamp the fiber optic cable 30.

Jaw portions 448, 468 and jaw portions 450, 470 are preferably set such that the angles between the jaw portions 448, 468 and the jaw portions 450, 470 are larger than the angle between the blades 422, 428.

Because of the position of the clamps 444, 446 on the cutting portions 420, 426, the jaw portions 448, 450, 468, 470 will come into contact with the fiber optic cable 30 after the blades 422, 428 as the jaw portions 448, 450, 468, 470 are set at a larger angle than are the blades 422, 428. It should be noted that the blades 422, 428 should not be set at such an angle that they will cut through the strength reinforcement strands 33 of the fiber optic cable 30 until after the jaw portions 448, 450, 468, 470 have clamped the fiber optic cable 30, placing the strength reinforcement strands 33 into tension.

Figure 14:
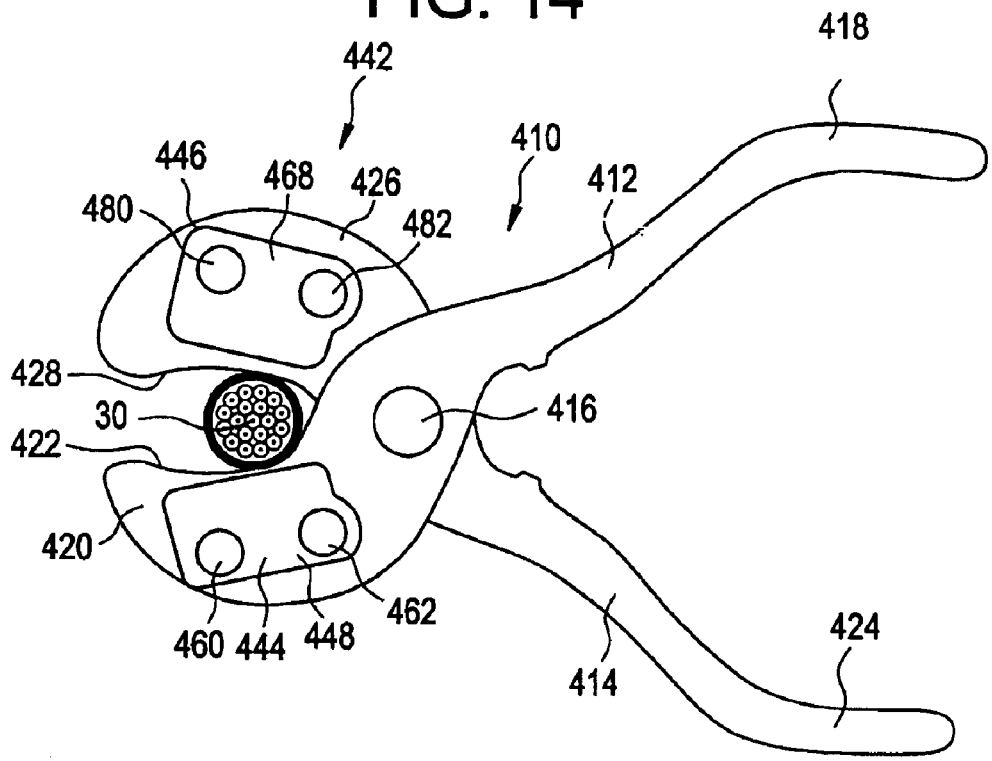
FIG. 14 is a side elevational view of a fourth embodiment of a novel cable cutter which incorporates features of the invention, such cable cutter being shown in an open condition.

Operation of the cable cutter 410 is shown in FIGS. 14–17. In FIG. 14, when the cable cutter 410 is in the open condition, the handle portions 418, 424 are extended away from each other thus forcing the cutting portions 420, 426 to be forced away from each other. Because the cutting portions 420, 426 are forced away from each other, jaw portions 448, 468 and jaw portions 450, 470 are also forced away from each other. The user places a fiber optic cable 30 between the cutting portions 420, 426, jaw portions 448, 468 and jaw portions 450, 470.

Figure 15:
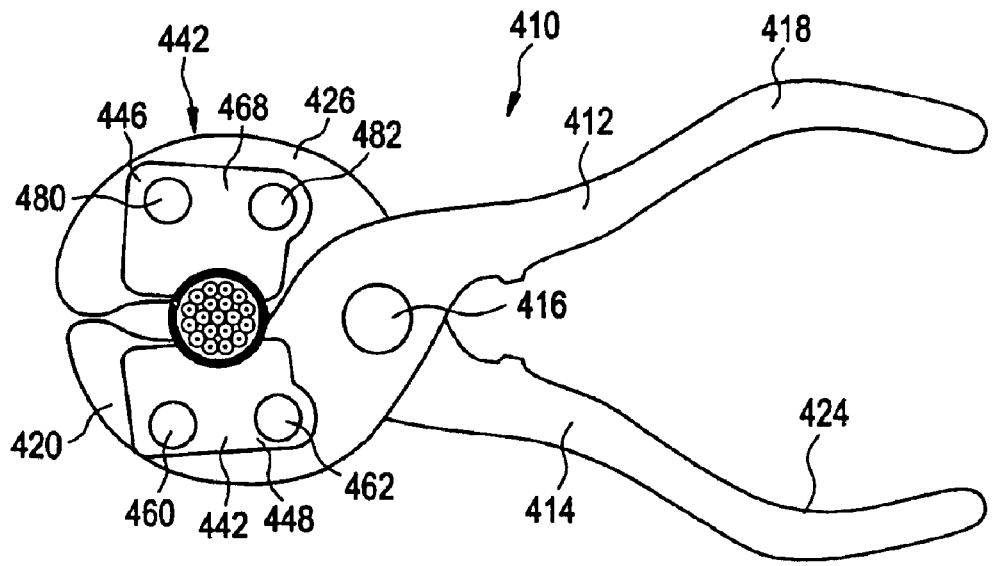
FIG. 15 is a side elevational view of the fourth embodiment of the cable cutter in a partially closed condition.

In FIG. 15, when the cable cutter 410 is in a partially closed condition, the handle portions 418, 424 are moved closer together by a user gripping the handle portions 418, 424 and squeezing. Because the handle portions 418, 424 are moved closer together, the cutting portions 420, 426 are also moved closer together such that the blades 422, 428 of the cutting portions 420, 426 begin to cut into the fiber optic cable 30. After the blades 422, 428 begin to cut into the fiber optic cable 30, the jaw portions 448, 468 and the jaw portions 450, 470 clamp the fiber optic cable 30 to place the strength reinforcement strands 33 within the fiber optic cable 30 into tension.

Figure 16:
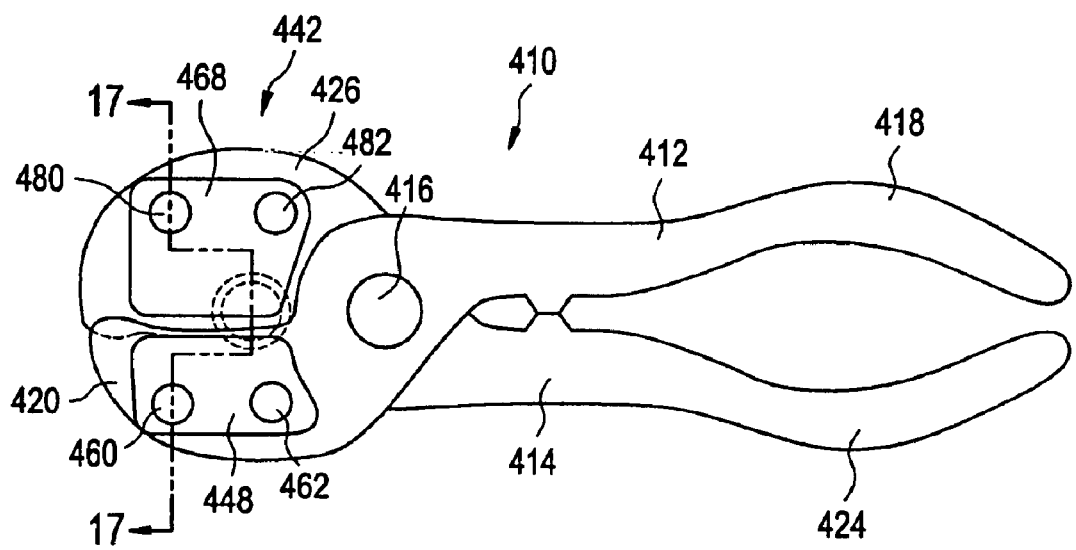
FIG. 16 is a side elevational view of the fourth embodiment of the cable cutter in a completely closed condition.

In FIGS. 16 and 17, when the cutter 410 is in the closed condition, the user has continued to squeeze the handle portions 418, 424 further together, thus forcing the cutting portions 420, 426 to come further together. It should be noted that at this point, the jaw portions 448, 450, 468, 470 do not move because the jaw portions 448, 450, 468, 470 move against the rubber bushings 458, 478 to clamp the fiber optic cable 30 while the cutting portions 420, 426 move to allow the blades 422, 428 to move through the fiber optic cable 30 to cut the strength reinforcement strands 33 which are in tension, along with the outer jacket 31, the buffer members 39, the fiber coatings 37 and the optic fibers 35.

After the cut of the fiber optic cable 30 is made, the user then pulls the handle 418, 424 apart, returning the cutter 410 to its open position as shown in FIG. 14. The user is then free to remove the fiber optic cable 30, which is now cut, to do any necessary work that needs to be done with the fiber optic cable 30.

As can be seen from all of the foregoing embodiments, the general method of using each of the novel cutters 110, 210, 310, 410 is relatively similar. The user first places the fiber optic cable 30 between the cutting blades 122, 128; 222, 228; 322, 328; 422, 428 of the cutter 110, 210, 310, 410 and the jaw portions 148, 150, 160, 162; 250, 252, 274, 276; 352, 354, 364, 366; 448, 450, 468, 470 of the clamping mechanism 142, 242, 342, 442. The user next grips the handles 118, 124; 218, 224; 318, 324; 418, 424 of the cutter 110, 210, 310, 410 and begins to squeeze the handles 118, 124; 218, 224; 318, 324; 418, 424 together. By squeezing the handles 118, 124; 218, 224; 318, 324; 418, 424 together, the user forces the jaw portions 148, 150, 160, 162; 250, 252, 274, 276; 352, 354, 364, 366; 448, 450, 468, 470 of the clamping mechanism 142, 242, 342, 442 to come into contact with the fiber optic cable 30 either prior to, or soon after, the cutting blades 122, 128; 222, 228; 322, 328; 422, 428 come into contact with the fiber optic cable 30. The clamping mechanism 142, 242, 342, 442 then clamps the fiber optic cable 30, thereby placing the strength reinforcement strands 33 within the fiber optic cable 30 into tension. By further squeezing the handles 118, 124; 218, 224; 318, 324; 418, 424 together, the user forces the cutting blades 122, 128; 222, 228; 322, 328; 422, 428 of the cutter 110, 210, 310, 410 to cut through the strength reinforcement strands 33 within the fiber optic cable 30. It is to be understood that in each embodiment of the cutter 110, 210, 310, 410, the blades 122, 128; 222, 228; 322, 328; 422, 428 of the cutter 110, 210, 310, 410 can come into contact with the fiber optic cable 30 before or after the clamping mechanism 142, 242, 342, 442 comes into contact with the fiber optic cable 30, so long as the strength reinforcement strands 33 of the fiber optic cable 30 are placed into tension prior to the blades 122, 128; 222, 228; 322, 328; 422, 428 of the cutter 110, 210, 310, 410 cutting through the strength reinforcement strands 33 within the fiber optic cable 30.

While preferred embodiments of the present invention are shown and described, it is envisioned that those skilled in the art may devise various modifications of the present invention without departing from the spirit and scope of the appended claims.

The invention is claimed as follows:

1. A tool for cutting a workpiece having strength reinforcement members therein, said tool comprising:
   a pair of levers;
   means for cutting the workpiece, said cutting means being operatively associated with said pair of levers such that said cutting means is configured to cut the workpiece during a single manipulation of said pair of levers; and
   means for clamping the workpiece, said clamping means being connected to said cutting means such that said clamping means is configured to clamp the workpiece during said single manipulation of said pair of levers, said clamping means placing the strength reinforcement members within the workpiece in tension prior to said cutting means cutting through the strength reinforcement members within the workpiece.

2. A tool as defined in claim 1, wherein said cutting means includes first and second members which are offset from one another.

3. A tool for cutting a workpiece having strength reinforcement members therein, said tool comprising:

means for cutting the workpiece, said cutting means including first and second members which are offset from one another, said first and second members are connected at a joint, said first and second members capable of being moved toward or away from one another about said joint; and means for clamping the workpiece, said clamping means being connected to said cutting means, said clamping means placing the strength reinforcement members within the workpiece in tension prior to said cutting means cutting through the strength reinforcement members within the workpiece, said clamping means being moved toward the workpiece when said first and second members are moved toward one another about said joint, said clamping means being moved away from the workpiece when said first and second members are moved away from one another about said joint.

4. A tool as defined in claim 2, wherein each of said first and second members have blades provided thereon.

5. A tool for cutting a workpiece having strength reinforcement members therein, said tool comprising:

means for cutting the workpiece, said cutting means includes first and second members which are offset from one another, each of said first and second members have blades provided thereon, said blades have first sides and second sides, said first sides being longer than said second sides, said first sides being proximate to one another, and said second sides being distal from one another; and means for clamping the workpiece, said clamping means being connected to said cutting means, said clamping means placing the strength reinforcement members within the workpiece in tension prior to said cutting means cutting through the strength reinforcement members within the workpiece.

6. A tool as defined in claim 1, wherein said clamping means includes members having pointed ends.

7. A tool as defined in claim 1, wherein said cutting means includes first and second members which are connected at a joint, said clamping means being connected to said joint.

8. A tool as defined in claim 1, wherein an angle between said clamping means is smaller than an angle between said cutting means such that said clamping means will engage the workpiece to place the strength reinforcement members within the workpiece in tension prior to said cutting means cutting into the workpiece.

9. A tool for cutting a workpiece having strength reinforcement members therein, said tool comprising:

means for cutting the workpiece; and means for clamping the workpiece, said clamping means being connected to said cutting means, said clamping means placing the strength reinforcement members within the workpiece in tension prior to said cutting means cutting through the strength reinforcement members within the workpiece, an angle between said clamping means being larger than an angle between said cutting means such that said clamping means engages the workpiece to place the strength reinforcement members within the workpiece in tension after said cutting means begins to cut into the workpiece but prior to said cutting means cutting into the strength reinforcement members within the workpiece.

10. A tool as defined in claim 1, wherein said cutting means includes first and second members, each said first and second member having a handle portion thereon, and wherein a normally expanded spring is connected between said handle portions, said normally expanded spring forcing said handle portions apart.

11. A tool as defined in claim 1, wherein said clamping means includes a lower clamp and an upper clamp, said lower clamp extending around said cutting means, said upper clamp extending around said cutting means.

12. A tool as defined in claim 11, wherein said lower clamp has a first jaw portion on a first side of said cutting means and a second jaw portion on a second side of said cutting means, said upper clamp has a first jaw portion on a first side of said cutting means and a second jaw portion on a second side of said cutting means.

13. A tool as defined in claim 12, wherein said first jaw portion of said lower clamp and said first jaw portion of said upper clamp are in alignment with one another, and wherein said second jaw portion of said lower clamp and said second jaw portion of said upper clamp are in alignment with one another.

14. A tool as defined in claim 11, wherein said lower and upper clamps include first and second extending portions and bridge portions, said bridge portion of said lower clamp extending around said cutting means, said bridge portion of said upper clamp extending around said cutting means, said extending portions being positioned distal to said cutting means.

15. A tool as defined in claim 14, wherein at least one normally expanded spring connects said extending portions of said lower and upper clamps, said at least one normally expanded spring forcing said first and second extending portions apart, such that said lower and upper clamps are forced apart.

16. A tool as defined in claim 11, wherein said lower and upper clamps include a base member having jaw portions extending therefrom, each said jaw portion extending on opposite sides of said cutting means, a plate, a compressible member positioned between said base member and said plate, and a connecting member which connects said clamps to said cutting means.

17. A tool as defined in claim 16, wherein said jaw portions of said lower clamp extend perpendicularly from said base member of said lower clamp, said base member of said lower clamp extending around said cutting means, and wherein said jaw portions of said upper clamp extend perpendicularly from said base member of said upper clamp, said base member of said upper clamp extending around said cutting means.

18. A tool as defined in claim 17, wherein said compressible member of said lower clamp abuts said base member of said lower clamp, said plate of said lower clamp abuts said compressible member of said lower clamp, said connecting member of said lower clamp extending through said plate, said compressible member, and said base member of said lower clamp, said connecting member of said lower clamp being fixedly attached to said plate of said lower clamp and to said cutting means, and wherein said compressible member of said upper clamp abuts said base member of said upper clamp, said plate of said upper clamp abuts said compressible member of said upper clamp, said connecting member of said upper clamp extending through said plate, said compressible member, and said base member of said upper clamp, said connecting member of said upper clamp being fixedly attached to said plate of said upper clamp and to said cutting means.

19. A tool as defined in claim 16, wherein said plates are formed of steel.

20. A tool as defined in claim 17, wherein said compressible members are formed of rubber.

21. A tool as defined in claim 11, wherein each said lower and upper clamps includes a base member having jaw portions extending therefrom, and an arm member extending from said base member, said jaw portion of said lower clamp extending on opposite sides of said cutting means, said jaw portion of said upper clamp extending on opposite sides of said cutting means.

22. A tool as defined in claim 21, wherein said arm members are formed of spring steel.

23. A tool as defined in claim 21, wherein said cutting means includes first and second handle portions, said jaw portions of said lower clamp extending perpendicularly from said base member of said lower clamp, said base member of said lower clamp extending around said cutting means, said base member of said lower clamp being attached to said arm member of said lower clamp, said arm member of said lower clamp being connected to said first handle portion, and said jaw portions of said upper clamp extending perpendicularly from said base member of said upper clamp, said base member of said upper clamp extending around said cutting means, said base member of said upper clamp being attached to said arm member of said upper clamp, said arm member of said upper clamp being connected to said second handle portion.

24. A tool as defined in claim 1, wherein said clamping means includes a lower clamp and an upper clamp, said lower clamp has a first jaw portion on a first side of said cutting means and a second jaw portion on a second side of said cutting means, said upper clamp has a first jaw portion on a first side of said cutting means and a second jaw portion on a second side of said cutting means.

25. A tool as defined in claim 24, wherein said first jaw portion of said lower clamp and said first jaw portion of said upper clamp are in alignment with one another, and wherein said second jaw portion of said lower clamp and said second jaw portion of said upper clamp are in alignment with one another.

26. A tool for cutting a workpiece having strength reinforcement members therein, said tool comprising:

means for cutting the workpiece; and means for clamping the workpiece, said clamping means being connected to said cutting means, said clamping means placing the strength reinforcement members within the workpiece in tension prior to said cutting means cutting through the strength reinforcement members within the workpiece, said clamping means includes a lower clamp and an upper clamp, said lower clamp has a first jaw portion on a first side of said cutting means and a second jaw portion on a second side of said cutting means, said upper clamp has a first jaw portion on a first side of said cutting means and a second jaw portion on a second side of said cutting means, said lower and upper clamps each further include at least one compressible member, at least one spacing member and at least one connecting member, said at least one compressible member being positioned within said cutting means, such that each said at least one connecting member extends through said first jaw portions, said at least one compressible members, said at least one spacing members and said second jaw portions to connect said clamps to said cutting means.

27. A tool as defined in claim 26, wherein said compressible members are formed of rubber.

28. A tool as defined in claim 26, wherein said spacing members are formed of metal.

29. A method of cutting a workpiece having strength reinforcement members therein, said method comprising the steps of:

a) providing a tool including first and second members having cutting means for cutting the workpiece, said first and second members being connected to one another to allow said cutting means to move toward and away from each other, and clamping means attached to said first and second members for engaging the workpiece to place the strength reinforcement members within the workpiece in tension prior to said cutting means cutting through the strength reinforcement members within the workpiece;

b) placing the workpiece between said cutting means and said clamping means;

c) moving said cutting means toward each other to force said clamping means into engagement with the workpiece, thereby placing the strength reinforcement members within the workpiece in tension; and d) moving said cutting means further toward each other to force said cutting means to cut completely through the workpiece.

30. A tool as defined in claim 1, wherein said clamping means clamps the workpiece in a different plane from which the cutting means cuts the workpiece.

31. A method of cutting a workpiece having strength reinforcement members therein, said method comprising the steps of:

a) providing a tool including a pair of levers, means for cutting the workpiece which is operatively associated with said pair of levers, and means for clamping the workpiece, said clamping means being connected to said cutting means; and b) manipulating said pair of levers one time, said one manipulation of said levers causing said clamping means to place the strength reinforcement members within the workpiece in tension, said one manipulation of said levers further causing said cutting means to cut through the strength reinforcement members within the workpiece, said clamping means placing the strength reinforcement members within the workpiece in tension prior to said cutting means cutting through the strength reinforcement members within the workpiece.

* * * * *